United States Patent [19]
Bellos

[11] Patent Number: 6,019,912
[45] Date of Patent: Feb. 1, 2000

[54] POLYVALENT METAL CATIONS IN COMBINATION WITH DITHIOCARBAMIC ACID COMPOSITIONS AS BROAD SPECTRUM DEMULSIFIERS

[75] Inventor: Thomas J. Bellos, St. Louis, Mo.

[73] Assignee: Baker Hughes Incorporated, Houston, Tex.

[21] Appl. No.: 08/333,810

[22] Filed: Nov. 3, 1994

[51] Int. Cl.$^7$ .......................... B01D 17/04; C10G 33/04
[52] U.S. Cl. .................... 252/338; 252/332; 252/344; 210/708; 210/728
[58] Field of Search .................... 252/332, 338, 252/344; 210/708, 728

[56] References Cited

U.S. PATENT DOCUMENTS

| | | | |
|---|---|---|---|
| 4,342,657 | 8/1982 | Blair, Jr. ................................. | 252/338 |
| 4,689,177 | 8/1987 | Thompson et al. ...................... | 252/344 |
| 4,826,625 | 5/1989 | Thompson et al. ...................... | 252/344 |
| 4,864,075 | 9/1989 | Thompson et al. ...................... | 558/237 |
| 4,956,099 | 9/1990 | Thompson et al. ...................... | 210/764 |
| 5,026,483 | 6/1991 | Thompson et al. ...................... | 210/708 |
| 5,089,227 | 2/1992 | Thompson et al. ...................... | 422/16 |
| 5,089,619 | 2/1992 | Thompson et al. ...................... | 544/357 |
| 5,190,683 | 3/1993 | Evain et al. ............................. | 252/60 |
| 5,200,086 | 4/1993 | Shah et al. .............................. | 252/358 |
| 5,368,779 | 11/1994 | Snethen .................................. | 210/729 |
| 5,433,863 | 7/1995 | Braden et al. .......................... | 252/358 |
| 5,523,002 | 6/1996 | Carey et al. ............................ | 210/708 |

OTHER PUBLICATIONS

Handbook of Chemistry and Physics, Thirty–Fifth Edition (Chemical Rubber Publishing Co, Cleveland, OH) pp. 3087, 1953 month unavailable.

Hawley's Condensed Chemical Dictionary, Eleventh Edition (Van Nostrand Reinhold Company, NY, NY) pp. 837 & 1232, 1987 month unavailable.

*Primary Examiner*—Richard D. Lovering
*Assistant Examiner*—Daniel S. Metzmaier
*Attorney, Agent, or Firm*—Howell & Haferkamp, L.C

[57] ABSTRACT

A method for resolving an oil-and-water emulsion is disclosed. The method comprises adding to the emulsion (1) if the emulsion does not contain a desirably high concentration of polyvalent metal cations of at least one part per million by weight, an amount of polyvalent metal cations sufficient to result in the desirably polyvalent metal cation concentration in the emulsion, and (2) an effective demulsifying amount of a combination of a terminating agent that is either a non-emulsifying hydrotrope composition or a coupling agent, and a composition comprising a polydithiocarbamate compound comprising at least two groups represented by the formula —$(OR^1)_x NHC(:S)SR^2$, wherein $R^1$ represents an alkylene group of 1 to 30 carbon atoms, $R^2$ represents an alkali or alkaline earth metal group or an ammonium group; and x represents an integer of from 1 to about 250 independently selected for each of such groups such that the total of the integers x is, on average, from 3 to about 250. Related compositions are also disclosed.

31 Claims, No Drawings

POLYVALENT METAL CATIONS IN COMBINATION WITH DITHIOCARBAMIC ACID COMPOSITIONS AS BROAD SPECTRUM DEMULSIFIERS

BACKGROUND OF THE INVENTION

1. Field of the Invention

The present invention relates to demulsification and more particularly to the use of polyvalent metal cations in combination with polydithiocarbamic acid compositions and certain hydrotropes as broad spectrum demulsifiers.

2. Description of Prior Art

Many disparate types of emulsions are encountered in a number of different industries. An emulsion is a mixture of two immiscible liquids, one being dispersed in the form of small droplets through the other. Oil-and-water emulsions are found in the form of water-in-oil emulsions or oil-in-water emulsions, the latter form being referred to sometimes as reverse emulsions. Emulsions are stabilized by the presence of surfactants and solids in the interfacial area and by the presence of a charge such as when water is the continuous phase. In addition, many other factors can affect emulsion stability. Among these factors may be noted pH, viscosity, particle size, density disparities, phase composition, mechanical shears and so forth.

As a result of this large number of factors affecting emulsion stability, emulsions differ widely in character and involve complicated interactions of factors, making the predictability of the efficacy of a particular demulsifier on a particular type of emulsion nearly impossible without a test. Thus, the distinctive characteristics of emulsions and the myriad of differences among emulsions have required a wide variety of demulsifier types for use with the wide variety of emulsions in existence.

One type of demulsifier that has been discovered with particular applicability to reverse emulsions is that of U.S. Pat. Nos. 4,689,177, 4,826,625, and 5,089,619 which are incorporated herein by reference. Typically, each type of demulsifier is effective for only a particular type or small range of types of emulsions. In fact, for example, it is common for a demulsifier that is found to be effective in resolving an emulsion that occurs in connate water at one oil well to be found to be ineffective even on what otherwise would be expected to be the same type of emulsion at a nearby well, even in the same production field. Therefore, hundreds or thousands of different demulsifiers have been developed to treat the various emulsions that are encountered.

This particularity of demulsifiers to specific emulsions creates many serious problems. Many different demulsifiers must be synthesized by many different processes and a large number of demulsifiers must be stocked, with adequate supplies of each demulsifier. In many cases, sufficiently effective or low cost demulsifiers have yet to be found. In addition, the various demulsifier types are based on many different types of unrelated chemistries and theories of operation, defying on ability to apply a single unified theory of demulsification and demulsifier selection. Thus, the process of locating a satisfactory demulsifier for a particular emulsion often involves a lengthy series of trials and errors, wrong paths and frequent dead ends. As a result, a testing process, which is often extensive and time-consuming, must be carried out for each type of emulsion in order to locate an effective demulsifier, and if the emulsion changes somewhat, a new demulsifier might have to be located. And it is not uncommon that even after such arduous searches, no satisfactory demulsifier is located. In the meantime, production is lost and shut-downs may result. Further, without a satisfactory demulsifier, increasing environmental concerns and the need to meet increasingly stringent governmental regulations might require the permanent shutting down of some wells and production fields.

Accordingly, many industries have been searching futilely for decades for a convenient demulsifier that is effective over a broad spectrum of emulsions. It is desired that such demulsification be relatively simple and economical in that it requires the simple addition of a composition as opposed to the use of mechanical demulsification techniques. Moreover, it is believed that the optimal composition be a blend that permits adaption and optimization for a wide variety of emulsions by simple adjustment of the blend components and their relative proportions. In particular, a series of demulsifiers based on a single chemistry and theory is desired so that a demulsifier may be tailored for a particular emulsion without the need for such extensive testing and often futile procedures that are so prone to wrong tracks.

SUMMARY OF THE INVENTION

The present invention, therefore, is directed to a novel method for resolving an oil-and-water emulsion. According to the method, a polyvalent metal cation concentration in the emulsion of a desired level of at least one part per million by weight is attained by addition of such cations to the emulsion if they are not already present at the desired level. Then, an effective demulsifying amount of a combination of a terminating agent (which may be a coupling agent or agents or a non-emulsifying hydrotrope or hydrotropes containing terminal sulfonate or sulfate groups) and a composition comprising a polydithiocarbamate compound having at least two groups represented by the formula —$(OR^1)_x NHC(:S)SR^2$, wherein $R^1$ represents an alkylene group of 1 to 30 carbon atoms, $R^2$ represents an alkali metal, an alkaline earth metal, an ammonium group, or an amine group (e.g., a secondary or tertiary amine group) and x represents an integer of from 1 to about 250 independently selected for each of such groups such that the total of the integers is, on average, from 3 to 250, is added to the emulsion. Preferably, the polydithiocarbamate compound has two to four, more preferably three or more, and most preferably three, such dithiocarbamate groups as in the tridithiocarbamate of the formula

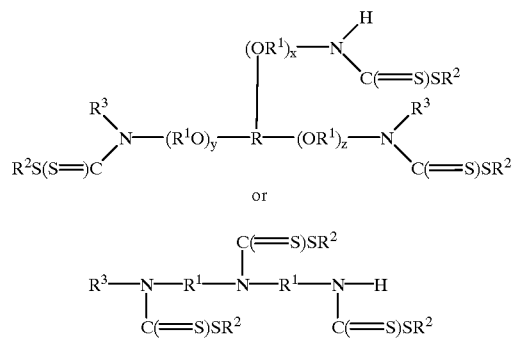

wherein:

R represents an organic triyl group, such as an alkane, alkene, aralkane, aralkene, alkarene or arene triyl group or such moieties with hetero substituents in place of carbon (e.g., an ether triyl), preferably an alkane triyl group of 1 to 30 carbon atoms;

$R^1$ and $R^2$ are as defined above;

each $R^3$ is, independently, hydrogen or an alkyl, alkenyl, aralkyl, aralkenyl or alkaryl, or such organic moieties with hetero substituents in place of carbon (such as an alkoxy or ether group), but is preferably hydrogen or an alkyl or alkenyl group of 1 to about 30 carbon atoms; and x, y and z represent integers which may be the same or different but each must equal at least 1, the sum of x+y+z, on average, being equal to 3 to 250, is added to the emulsion.

The present invention also is directed to a novel composition comprising a non-emulsifying hydrotrope containing a sulfonate or sulfate group, preferably at the terminal position and a polydithiocarbamate compound as defined above.

Among the several advantages of this invention, may be noted the provision of a method for resolving a broad spectrum of emulsions; the provision of such method that is relatively simple and economical in that it requires the simple addition of a blend as opposed to the use of mechanical demulsification techniques; the provision of such method that permits adaption and optimization for a wide variety of emulsions by simple adjustment of the blend components and their relative proportions; and the provision of compositions useful in such method.

DETAILED DESCRIPTION OF THE PREFERRED EMBODIMENTS

In accordance with the present invention, it has been discovered that if polyvalent metal cations are present in a sufficiently high concentration in the emulsion to be treated, adding a sufficient amount of a combination of a terminating agent (that is, at least one type of non-emulsifying hydrotrope containing a terminal sulfonate or sulfate group or at least one type of coupling agent, or a combination thereof) and a polydithiocarbamate compound resolves a surprisingly broad spectrum of emulsions. In fact, it is believed that this technique might provide what several industries have been searching for over the last several decades: nearly universal demulsification. Although different specific formulations are suitable for different emulsions, the basic types of ingredients for the demulsifier for each emulsion are the same and demulsification is carried out according to the same concept. The specific formulation may thus be coordinated and tailored for each emulsion. And, although other more simple or less expensive demulsifiers will still be desirable in many situations, on occasions which such simple or inexpensive demulsifiers are not useful, a demulsifier based on the chemistry and theory of this invention may be formulated according to the characteristics of the emulsion. Arduous and blind trial and error processes as previously required and the need to stock as wide a range of chemicals may be avoided. Moreover, the demulsification technique of this invention employs a blend and a process that permit adaption and optimization for a wide variety of emulsions by simple adjustment of the blend components and their relative proportions and the addition of an appropriate metal ion at the most efficacious location. As used herein, the prefix "poly", as in "polydithiocarbamate" or "polyvalent", refers to two or more.

Although other polydithiocarbamates comprising at least two, and preferably at least three, groups of the form $—(OR^1)_xNHC(:S)SR^2$, wherein $R^1$ represents an alkylene group of 1 to 30 carbon atoms, $R^2$ represents an alkali or alkaline earth metal group, an ammonium group or an amine group, and x represents an integer of from 1 to about 250 independently selected for each of such groups such that the total of the integers is, on average, from 3 to 250, may be employed in this invention, tridithiocarbamate compounds described as in claim 1 of U.S. Pat. No. 4,826,625 have been found particularly useful. The present inventor's experience with the agents of that patent has been that such agents do not effect demulsification at all geographic locations. The present inventor has now discovered, surprisingly, that the bulk of successful applications take place where an appropriate metal ion is present. However, in such situations, a large mass often is formed that makes separation difficult. For example, in certain applications, such as in centrifuge and Vortoil installations, one of the problems encountered with employment of the dithiocarbamate chemistry has been the generation of voluminous floc. Accordingly, the present inventor has now discovered that by introducing appropriate ions where necessary and incorporating certain hydrotropes and/or coupling agents together with polydithiocarbamate compounds, extremely effective demulsification can be achieved for a very broad range of emulsions.

Thus, with respect to a particular emulsion, it may be that the polyvalent metal concentration inherent in the emulsion is sufficiently high for carrying out the demulsification of this invention. For example, connate production water found in oil and gas fields many times contains a high concentration of iron ions; sometimes on the order of five or ten ppm or higher based on weight. However, often the emulsion contains no polyvalent metal cations or at least a very low concentration of such cations. In such cases, superior demulsification may be attained by addition of metal ions to the emulsion. The metal ions may be added in the form of a metal salt.

The polyvalent metal cations required for carrying out the subject method should be divalent or trivalent, although effectiveness with four valences or more is possible. Particularly good results have been obtained with readily available salts containing ferrous and ferric ions, especially ferric ions, but other ions as identified in Example 8, below, also may be employed in addition to the ferrous or ferric ions or as an alternative thereto. In some situations, such as production water obtained in the absence of oxygen, the ferrous ion content might be sufficiently high for demulsification and separation. However, it has been found that adding ferric ions to the water results in a tighter floc, making separation even easier and more effective. Thus, at times, it may be desirable to add trivalent cations to the fluid to be treated even though it already contains an otherwise sufficient level of divalent cations.

While the present inventor does not wish to be bound to any particular theory, it is believed that this new technique operates by replacement of the cation referred to as $R^2$ in the $—(OR^1)_xNHC(:S)SR^2$ groups of the polydithiocarbamate compound with a polyvalent cation as a cross-linking agent. This addition of a metal salt differs from adding a coagulant or flocculant in that the polydithiocarbamate reacts directly with the metal ion forming a cross-linked polymer in situ. Thus, if the compound is a tridithiocarbamate compound as defined in U.S. Pat. No. 4,826,625, and the compound is represented for simplicity as $(TDC)(R^2)_3$, where $R^2$ is defined as in that patent (namely, an alkali metal, alkaline earth metal or an ammonium group) or an amine group, particularly a tertiary amine group, and TDC represents the tridithiocarbamate anion without the $R^2$ groups (that is:

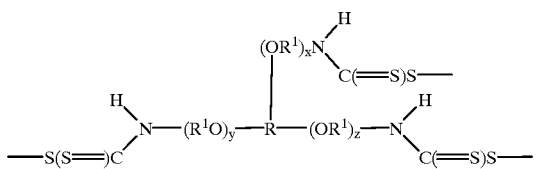

wherein each variable is defined as set forth in the noted patent), a cross-linked polymer of the following form results by substitution of a divalent metal cation $M^{+2}$ for $R^2$:

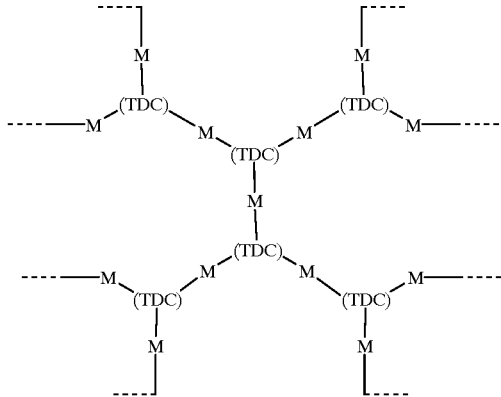

wherein TDC and M are defined as above. Similar reactions would be expected and higher polydithiocarbamate compounds and, if the metal cation is tri-valent or higher, for didithiocarbamate, with the number of branches from each polydithiocarbamate moiety dictated by the number of dithiocarbamate groups and the type and concentration of metal ion. Trivalent or higher valence cations would act as cross-linking agents in a similar manner. As a result, a polymeric matrix is formed in situ that acts as a type of sieve or filter to sweep out contaminants as it migrates to the interface between phases.

However, it has been found that the matrix becomes so large that it tends to form a grit or large fluffy mass in the oil phase, which is undesirable because it makes it difficult to salvage the oil in usable form. Nevertheless, it has been found that the addition of terminating agents that are certain chemical agents that act like hydrotropes alleviates this problem. Such agents are hydrotropes in that they appear to act to increase the water-solubility of the emerging matrix. The terminating agents also can be coupling agents such as oxide (mono or poly-oxide) modified alcohols phenols or amines or their sulfates or sulfonates. Preferred oxides are ethylene and propylene oxide, ideally ethylene oxide alone or propylene oxide, terminated with ethylene oxide.

The mechanism by which the hydrotrope aids in the demulsification process is not understood fully. It may be simply that the hydrotrope is a surfactant acting as a demulsifier. Or, the hydrotrope may compete with the dithiocarbamate to attach at some of the cross-linking sites (i.e., for a hydrotrope of the form $RSO_3Na$ added to a burgeoning polymer of the form $R'NC(:S)SNa$ in the presence of ferrous ions, the result being $RSO_3FeS(S:)CNR'$), imparting greater solubility to the polymer and causing the polymer to hold solids and oil less tenaciously.

In the case of a hydrotrope that dissociates into monovalent ions, the hydrotrope might act as a polymer terminator to react with the forming matrix to cap the cross-linking sites. In other words, it has been hypothesized that the hydrotrope might compete with the TDC ions in the polymer formation, halting the chain formation and limiting the size of the polymer. For example, the polymer illustrated above may be illustrated with two hydrotrope caps as follows wherein a monovalent hydrotrope ion is identified as (HT)-:

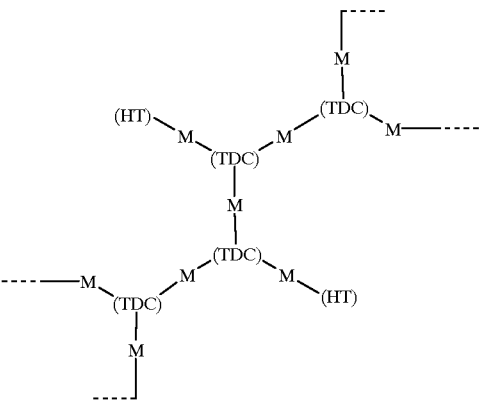

Thus, according to this hypothesis, the size of the polymer is thereby limited.

An optional method for limitation of the size of the polymer is by addition of a monodithiocarbamate, such as of the form $R^4(OR^1)_xN(H)C(:S)SM$ wherein $R^4$ represents an alkyl group of from 1 to about 30 carbons, $R^1$ represents an alkylene group of 1 to about 30 carbons and x is an integer of from 3 to about 250. Since the monodithiocarbamate is monofunctional, it can serve as an end cap, thereby limiting the polymer size. The oil is then held less tenaciously.

It has been found that tri-functional dithiocarbamates are especially effective in oil field applications, and it is believed that this is because their inter-reactions with polyvalent (i.e.; di- or higher) metal cations form a particularly dense cross-linked polymer in situ in many suitable oil field emulsions or those commonly thought of as being, or called, reverse or oil-in-water emulsions. This reaction forms an insoluble product when oil is present in sufficient quantity. Nevertheless, it is believed that any polydithiocarbamate compound may be employed and that it is sufficient simply that the compound have at least two dithiocarbamate groups; that is, at least two groups of the form $—(OR^1)_xNHC(:S)SR^2$, wherein $R^1$, $R^2$ and x are as defined above.

Accordingly, preferred polydithiocarbamates may be represented by the formula $R[(R'O)_xNHC(=S)SR^2]_n$, wherein R is an organic poly-yl group, wherein the number of available valences (the number of "yls") is equal to n, such as an alkane, alkene, aralkane, aralkene, alkarene or arene poly-yl group or such groups with a hetero substituent in place of a carbon (e.g., an ether poly-yl), but preferably an alkane poly-yl group of 1 to about 30 carbon atoms (such as, for example

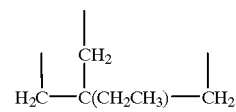

wherein $R^1$ and $R^2$ are as defined above), the x's are each independently a positive integer such that the total of the x's is at most about 250, and n is an integer and at least 2, preferably two to about four. An alternative polydithiocarbamate may be represented by the formula

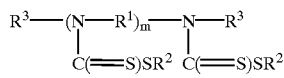

wherein $R^1$ and $R^2$ are as defined above, each $R^3$ is, independently, hydrogen or an alkyl or alkenyl, aralkyl, aralkenyl or alkaryl, or such organic moieties with hetero substituents in place of carbon (such as an alkoxy or ether group), but is preferably hydrogen or an alkyl or alkenyl group of 1 to about 30 carbon atoms, and m is an integer at least 1, preferably two to about three. Thus, the preferred tridithiocarbamate may be represented by the formula

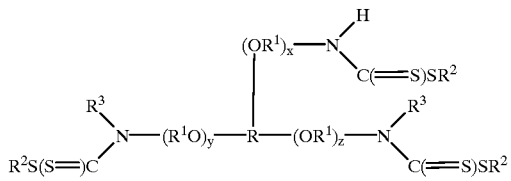

wherein:

R is as defined above, but preferably represents an alkane triyl group of 1 to 30 carbon atoms such as, for example,

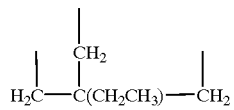

$R^1$ and $R^2$ are as defined above; and x, y and z represent integers which may be the same or different but each must equal at least 1, the sum of x+y+z, on average, being equal to 3 to 250. U.S. Pat. No. 4,826,625 describes such compositions in greater detail. The various R and $R^3$ groups in these formulae may be selected for enhanced solubility of the composition in the medium to be treated.

Other preferred tridithiocarbamates may be represented by the formula

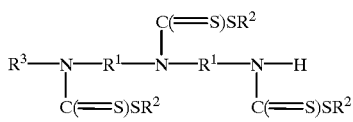

wherein $R^1$, $R^2$ and $R^3$ are as defined above. For example, the dithiocarbamate of this form may be

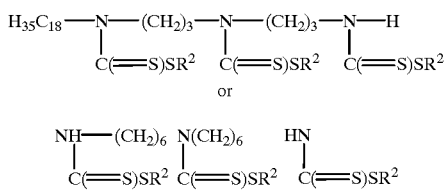

wherein $R^2$ is as defined above.

The technique of this invention may be carried out as follows. Although the polyvalent metal cations be added before or after the dithiocarbamate and hydrotrope components, it is preferred that they be added before. Thus, in a continuous flow treatment process, it is desirable to inject the polyvalent metal cation salt upstream of the other components in a manner and/or location that allows the cations to disperse throughout the stream or medium to be treated before injection of the dithiocarbamate and hydrotrope.

The amount of polyvalent metal cation added should be enough to achieve sufficient cross-linking between dithiocarbamate compound to form the matrix as discussed above. For example, for a divalent cation such as a ferrous salt, about one to about one hundred ppm (by weight) of a ten to twenty-five percent by weight active solution of the salt may be added, followed by treatment with about ten to about thirty ppm by weight of tridithiocarbamate.

Thus, metal salt is added at a rate sufficient to impart to the medium to be treated a salt concentration of about one to twenty-five ppm by weight, preferably about three to fifteen and more preferably about five to about twelve, such as about ten, ppm by weight. In some situations, the medium will contain polyvalent metal cations even before addition of metal salt at this stage and the metal salt need be added at a rate sufficient to bring the total polyvalent metal cation level to that described above. In some cases, the polyvalent metal cation concentration of the stream or other medium may be sufficiently high and in such cases addition of further metal salt is unnecessary.

Accordingly, the polyvalent metal cation and its salt should be water soluble at the desired concentration so that it can be applied to aqueous emulsions, or at least in a form that will allow it to react with the dithiocarbamate to form a floc. In addition, the cation and its salt should be chosen with due considerations of the character of the emulsion and the particular conditions and applications of the emulsion. For example, the cation and its salt should be non-corrosive (if possible) to the surfaces it may contact and for emulsions involved in biological processes, especially those employed in the production of articles for human ingestion, the cation and its salt should be non-toxic.

Ferrous chloride and ferrous sulfate have been found to be very good salts for many applications. Ferric sulfate and ferric chloride are also suitable for certain emulsions, but require a relatively low pH for them to have sufficient water solubility. However, as employed in the present method, the additions of these salts immediately upstream of the polydithiocarbamate in most instances yields good to excellent results.

The hydrotrope and dithiocarbamate may be added in either order or together. A simple test may be conducted on samples of the medium to be treated to determine the optimum amount of hydrotrope. According to the test, mixtures of the dithiocarbamate with various amounts of hydrotrope may be applied to various samples of the medium containing the metal ions and the quality and speed of separation observed, with the hydrotrope concentration that resulted in the optimal separation noted. Generally, the hydrotrope concentration will be in the range of about one to about 25, preferably about five to about fifteen, percent by weight of the total treating medium after addition of the hydrotrope and dithiocarbamate. The hydrotrope may be added to the blend in the form of a solid, such as a 93% concentration powder, if available. Ideally, the hydrotrope, which may be a mixture of more than one individual type of hydrotrope, is blended into or with the dithiocarbamate with or without excess base. If the hydrotrope is in the form of a powder, excess water may also be needed to cause the hydrotrope powder to dissolve.

A hydrotrope that will not inhibit demulsification should be selected. In fact, the hydrotrope preferably should aid in the demulsification and as such may be described as hydrotropes that appear to act as demulsifiers. It has been found that hydrotropes that contain at least one sulfate or sulfonate group, preferably at a terminal position, are especially suitable. Notable among such hydrotropes are salts of alkyl or alkaryl sulfates or sulfonates or salts of sulfated or sulfonated alcohols of from about six to about sixteen carbons, such as phenols having an alkyl chain of from about five to about ten carbons or organic moieties having a polyether chain of from one to about ten ethoxy groups. Thus, phenol and alcohol ether sulfate and sulfonates are the most preferred hydrotropes, although others are acceptable as well. The preferred salts are alkali metal, alkaline earth, ammonium or amine salts, especially the sodium salts.

An appropriate sulfonate may be produced, for example, by reaction of a phenol or alcohol with propane sultone. These starting materials may also have been first modified with ethylene oxide to form a polyethoxy phenol or alcohol. The ammonium salt is least desirable in those occasions in which its use tends to result in the formation of a small, floating solid or other such undesirable side products; however, even in this case, the formation of such solid is in no way detrimental to the process, especially when an ammonium salt of the hydrotrope is added in the presence of excess base and ammonia is released.

Particular organic sulfates and sulfonates that have been found to yield superior results include sodium toluene sulfonate, sodium xylene sulfonate (all isomers). However, even these agents have been found to exhibit better results if they are blended with, for example, an alcohol or phenol oxyalkylate having a terminal sulfate or sulfonate group. As noted, while the sodium salts are most desirable, inclusion of such sulfonates with other alkali metal, alkaline earth and ammonium cations is within the scope of the invention. Other salts of sulfates, sulfonic acid salts and Cytek aerosols (ester sulfonates) such as $ROSO_3M$, $RSO_3M$, $RO(CH_2CH_2O)_{1-10}CH_2CH_2CH_2SO_3M$,

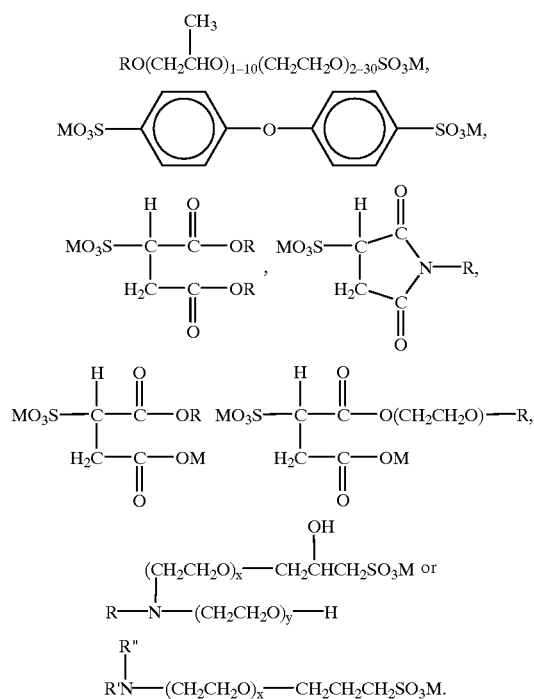

wherein each of R, R' and R" is an organic radical, especially a six to eighteen carbon organic radical (e.g., an alkyl or alkoxy group), such as one that is alpha olefin-derived, x and y are non-negative integers up to about fifty (preferably about tent to about thirty), provided that where x and y are both present, x+y=two to about fifty, preferably about ten to about thirty, and M is a cation such as an alkali metal, for example, a sodium or potassium ion, especially a sodium ion, have also been found to be effective. It seems that it is required simply that the hydrotrope increase the water solubility of the tridithiocarbamate when joined thereto so as to cause the oil in the emulsion to coalesce as large globs. If an ester sulfonate is used, care must be taken so as not to add too much excess base. Otherwise, the ester linkage may hydrolyze.

In any event, the hydrotrope or group of hydrotropes selected should be those that will not interfere with the demulsification process. In fact, a hydrotrope that can even facilitate the demulsification by aiding in the separation of the oil can be selected. In some instances, a particular hydrotrope may cause an emulsion to form with some crude oils. Application of the right surfactant or combination of surfactants is practiced in this art form. Those skilled in this art will readily recognize that they can determine by simple experimentation which hydrotropes should be employed for a particular oil.

Desirable hydrotropes have a sulfonate or sulfate group, especially a terminal sulfonate group. Of course, it is also desirable that the hydrotrope be a non-emulsifying hydrotrope; that is, one that does not encourage emulsification. Particularly preferred hydrotropes include alkylbenzene sulfonates or sulfonic acids wherein the alkyl group preferably is at most about six carbons (e.g., sodium-p-toluene sulfonic acid or sodium-xylene sulfonic acid) and alcohol oxyethylates or oxypropylates reacted with propane sulfone; that is, $L-O-(AO)_a(CH_2)_3SO_3M$, wherein L is the residue of the alcohol, M is a cation such as an alkali metal (especially sodium), L is generally a $C_1$ to about a $C_6$ alcohol, A is ethylene, n-propylene or isopropylene, a is an integer from 1 to about sixty, preferably, one to about thirty, more preferably one to about twenty and optimally one to about ten. It has been found, however, that this compound is best prepared by first alkoxylating the alcohol, and that the terminal alkoxy group should be an ethoxy for a highly reactive terminal site. Thus, the preferred compound may be written $L-O-(PrO)_b(EtO)_a(CH_2)_3SO_3M$, wherein L and M are as defined above, Pr is propylene (either n-propylene or i-propylene), Et is ethylene, b is an integer from zero to about 59, a is an integer from one to about sixty and a+b is from one to about sixty. Preferably, b is from zero to about 29, a is from one to about thirty and a+b is from one to about thirty. More preferably, b is from zero to about nineteen, a is from one to about twenty and a+b is from one to about twenty. Optimally, b is from zero to about nine, a is from one to about ten and a+b is from one to about ten. These examples should not be viewed as limiting but rather as illustrative.

In addition, certain sulfates have shown some effectiveness as polymerization-terminating hydrotropes, wherein polymerization means the cross-linking with a metal, as described earlier. Example of such sulfates include oxyethylated alcohol sulfates such as those based on about $C_6$ to about $C_{10}$ alcohols oxyethylated with about one to about seven moles of ethylene oxide per mole alcohol and reacted with sulfamic acid or $SO_3$ via Sulfan B or chlorosulfonic acid. Likewise, these alcohols, phenols and so forth may also first be modified with propylene or butylene oxide and then terminated with ethylene oxide to form a polyether and finally the sulfate and or sulfonate generated with the appropriate reagents. Generally, alkyl chains of more than about twelve carbons tend to impart some emulsifying characteristics to the compounds and so although alkyl chains of more than ten carbon atoms may be suitable, alkyl chains of ten or fewer carbon atoms, especially about five carbons or fewer, are preferred. These described surfactants also can be thought of as demulsifiers.

Evolution of a sulfide, such as FeS or $H_2S$ has been observed under certain circumstances in carrying out the present method. For example, the reaction between a compound having a terminal group •N(H)C(:S)S⁻ and $Fe^{+2}$ may yield FeS and a compound with the terminal group •N:C:S. Hydrogen sulfide formation has also been detected. However, it has been found that sulfide formation can be reduced or mostly eliminated by maintaining excess alkalinity in the formulated product containing the additives described. Thus, if needed, the alkalinity of the base dithiocarbamate may be increased by addition of a base in excess of the stoichiometric amount employed in the synthesis of the dithiocarbamate. The base should be one that forms a water soluble salt upon reaction with $H_2S$. For instance, sodium hydroxide reacts with $H_2S$ to form $Na_2S$ and water. Accordingly, non-limiting examples of suitable bases include NaOH, KOH and triethylamine. The excess base may be added in an amount as low as about 0.1 percent to as high as, for example, about twenty percent or more of the formula weight, but generally in the range of from about 0.5 to about ten percent of the formula weight.

Appropriate blends useful as demulsifiers in the subject method, therefore, would include a polydithiocarbamate as noted and a hydrotrope (which may be a combination of specific types of hydrotropes as well as excess base) as noted. Further, if the emulsion to be treated does not contain a sufficiently high concentration of polyvalent metal cations, such as at least about one part per million by weight and preferably at least about five parts per million by weight, a polyvalent metal cation, such as in the form of a polyvalent metal salt, is added to the emulsion before or after the treatment with the blend to produce the sufficiently high cation concentration in the emulsion. The blend may further contain a monodithiocarbamate and/or a base as discussed. Alternatively, a monodithiocarbamate may be employed, as stated above, in place of the hydrotrope as what is believed to be a chain-limiting agent. Likewise, a monoamine may be employed as a chain-limiting agent in the salt-forming step. In the presence of excess $CS_2$, a portion of the formula might include such species.

Thus, a typical blend formulation might comprise, by weight, 10 or more parts polydithiocarbamate, about two to about five parts hydrotrope (which may be a combination of different hydrotropes) and, optionally, about two to about ten parts water and about 0.2 to about 10 parts base. According to these proportions, about 0.2 to about 5 parts polyvalent metal cations in the form of a salt may be added to the emulsion to be treated either before or after the addition of the blend. The relative proportions of the components may be adjusted for optimization over a wide variety of emulsions. Typically, the blend would be added to the emulsion in a ratio of from about five to about 1,000 parts by weight, preferably from about 15 to about 100 parts by weight, more preferably from about 15 to about 50 parts by weight, such as about 20 to about 30 parts by weight, per million parts by weight of the emulsion.

These formulae and techniques have been found to be highly efficient in resolving even emulsions that have not been able to be demulsified by conventional techniques.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples, all percentages are given on a weight basis unless otherwise indicated.

EXAMPLE 1

Production water containing emulsified oil (1000 ppm) at a well site was found to contain 1 ppm iron. A tridithiocarbamate of the formula as set forth in claim 2 of U.S. Pat. No. 4,826,625 was added with little or no demulsification resulting in a Vortoil cyclone treater. An iron-containing flocculant (a 10% ferrous sulfate solution) then was added at a point upstream of the tridithiocarbamate injection point at a rate sufficient to increase the iron content to 10 parts by weight iron salt per million parts by weight production water. The reverse emulsion separated immediately, forming a heavy floc and mostly clear water. The residual free oil was removed by a flotation process employing a high molecular weight cationic polymer.

EXAMPLE 2

The method of Example 1, above, was carried out on a sample of off-shore production water high in calcium. A tridithiocarbamate of the formula as set for in claim 2 of U.S. Pat. No. 4,826,625 was added and only partial treatment resulted. An iron salt solution was added to another sample of the production fluid comprised of water, oil and salts to produce an iron concentration in the sample of 10 ppm. Application of the noted tridithiocarbamate plus sodium p-toluene sulfonate showed enhanced demulsification over that achieved with the tridithiocarbamate alone. Further, the floc that formed in the latter sample resolved to oil and water with no hard floc that sometimes forms at certain locations. By hard floc, it is intended to mean one that does require treatment to resolve the floc into its components: solids and oil.

EXAMPLE 3

At a location in California, it had been found that tridithiocarbamate in combination with sodium p-toluene sulfonic acid and/or sodium xylene sulfonate and an oxyethylated alcohol sulfate as its sodium salt at a level of 1 to 25% of the formula treated a reverse (O/W) emulsion only partially. An iron solution (ferrous sulfate) was added upstream of the tridithiocarbamate/hydrotrope solution in an amount sufficient to result in an iron concentration in the water of 7 ppm. The addition of iron resulted in effective treatment of the emulsion, causing the immediate formation of copious floc that did not form a rigid floc such as that sometimes generated by the use of tridithiocarbamate without metal salts of p-toluene sulfuric acid and/or xylene sulfuric acid.

EXAMPLE 4

Water obtained from an area in which oil is steam-produced contained a reverse (oil-in-water, or o/w) emulsion having an iron (or other) ion content too low for a tridithiocarbamate of the formula as set forth in claim 2 of U.S. Pat. No. 4,826,625 to function as a reverse demulsifier. Four samples of the water were tested. Iron sulfate in various amounts was added to three of the samples. The samples were given ten shakes and then a blend containing 50% of the noted tridithiocarbamate, 6% sodium toluene sulfonate/ 6% alkylphenol oxyethylated sulfate salt and 38% water was added to each sample in a proportion of about twenty parts by weight of the mixture to a million parts by weight of the sample. The samples were then shaken 25 times and placed on a viewing shelf for observation. The samples were then shaken 25 more times and again placed on a viewing shelf for observation. The samples then were shaken fifty more times and placed on the shelf for final observation. Oil quality was judged by whether there was floc or free oil on the surface of a floc. The following results were obtained.

|  |  |  | Water Quality at # of Shakes | | |
| --- | --- | --- | --- | --- | --- |
| Sample | Iron* | Blend** | 25 | 50 | 100 |
| 1 | 0 | 0 | bad | bad | bad |
| 2 | 3 | 20 | fair+ | good– | good |
| 3 | 6 | 20 | good+ | excellent | excellent |
| 4 | 10 | 20 | good– | good | good |

*Concentration in ppm of iron from added ferrous sulfate.
**Concentration in ppm of added blend.

Upon treatment, the oil appeared good in Samples 2 and 3 and contained floc in Sample 4.

EXAMPLE 5

The test of Example 4, above, was carried out on water from another location with a blend containing 50% of the noted tridithiocarbamate of Example 4, 5% sodium toluene sulfonate, 10% $C_{10}$ alcohol modified with six moles of ethylene oxide sulfonated with propane sultone (sodium salt), and 35% water, with the following results.

|  |  |  | Water Quality at # of Shakes | | |
| --- | --- | --- | --- | --- | --- |
| Sample | Iron* | Blend** | 25 | 50 | 100 |
| 1 | 0 | 0 | bad | bad | bad+ |
| 2 | 3 | 20 | good | good | good+ |
| 3 | 6 | 20 | good | good+ | good |
| 4 | 10 | 20 | fair | fair+ | good |

*Concentration in ppm of iron from added ferrous sulfate.
**Concentration in ppm of added blend.

Upon treatment, the oil appeared acceptably clear in all runs.

EXAMPLE 6

The test of Example 4, above, was carried out on sour crude oil production from another location blended with distilled water in a Waring blender for 30 seconds to produce an almost iron-free reverse emulsion. The test was carried out with a demulsifier that was a blend containing 50% of the noted tridithiocarbamate of Example 4, 7.5% sodium toluene sulfonate, 7.5% $C_8$–$C_{10}$ alcohol mixture modified with two moles of propylene oxide and six moles of ethylene oxide sulfated with chlorosulfonic acid formulated as its potassium salt, xylene sulfonate and 35% water, with the following results.

|  |  |  | Water Quality at # of Shakes | | |
| --- | --- | --- | --- | --- | --- |
| Sample | Iron* | Blend** | 25 | 50 | 100 |
| 1 | 0 | 0 | poor | poor | poor+ |
| 2 | 2 | 30 | fair | fair | fair |
| 3 | 4 | 30 | good | good+ | good+ |
| 4 | 6 | 30 | excellent | excellent | excellent |
| 5 | 10 | 30 | good | good | good+ |

*Concentration in ppm of iron from added ferrous sulfate.
**Concentration in ppm of added blend.

Upon treatment, the oil appeared as a reverse emulsion in Sample 1, appeared acceptably clear in Samples 2–4, but broke away from the solids in Sample 2, and contained an undesirably high level of floc in Sample 5.

EXAMPLE 7

The test of Example 6, above, was carried out a second time, but this time the demulsifier was simply the noted tridithiocarbamate as synthesized and contained no sulfonate, with the following results.

|  |  |  | Water Quality at # of Shakes | | |
| --- | --- | --- | --- | --- | --- |
| Sample | Iron* | Blend** | 25 | 50 | 100 |
| 1 | 0 | 0 | poor | poor | poor |
| 2 | 2 | 25 | fair | fair | fair+ |
| 3 | 4 | 25 | good | good | good+ |
| 4 | 6 | 25 | excellent | excellent | excellent |
| 5 | 8 | 25 | excellent | excellent | excellent |
| 6 | 10 | 25 | excellent | excellent | excellent |

*Concentration in ppm of iron from added ferrous sulfate.
**Concentration in ppm of added blend.

Upon treatment, the oil appeared as a reverse emulsion in Sample 1, solids appeared in the oil layer in Sample 2, the oil appeared fair in Samples 3 and 4 and poor in Samples 5 and 6, and the oil and solids separated very slowly in Samples 3–6. When ferric chloride was substituted for ferrous sulfate, the floc thus formed appeared to be reduced in volume and the water appeared clear.

EXAMPLE 8

Various polyvalent metal cations and hydrochloric acid were tested by adding their salts to distilled water containing the tridithiocarbamate of Example 4 and observing the results. The following table shows the speed of precipitate formation ("Ppt Formation Speed") and the density and character of the precipitate ("Ppt Density" and ("Ppt Character") for each metal cation ("Ion") derived from the metal salt ("Salt") added to the solution. The density is given relative to water, indicating the location of the precipitate relative to the water phase.

| Ion | Salt | Ppt Formation Speed | Ppt Density | Ppt Character |
| --- | --- | --- | --- | --- |
| $Al^{+3}$ | Alum | Fast | Higher | Fine Floc |
| $Al^{+3}$ | Aluminum Chloride | Moderate | Lower |  |
| $Sb^{+3}$ | Antimony Potassium Tartrate | Moderate | Lower | Fluffy Floc |
| $Ba^{+2}$ | Barium Chloride | No Ppt |  |  |
| $B^{+3}$ | Boric Acid | Very Slow (Days) | Same | Hazy |
| $Ca^{+2}$ | Calcium Chloride | No Ppt |  |  |

-continued

| Ion | Salt | Ppt Formation Speed | Ppt Density | Ppt Character |
|---|---|---|---|---|
| $Cr^{+6}$ | Sodium Dichromate | No Ppt | | |
| $Cu^{+2}$ | Cupric Chloride | Fast | Higher | Fluffy Floc |
| $Co^{+2}$ | Cobalt Chloride | Fast | Higher | Fluffy Floc |
| $Fe^{+3}$ | Ferric Chloride (Acidified) | Fast | Lower Higher | Fluffy Floc Fine Floc |
| $Fe^{+2}$ | Ferrous Ammonium Sulfate | Fast | Lower Higher | Coarse Fluffy Floc Fine Floc |
| $Fe^{+2}$ | Ferrous Sulfate | Fast | Lower | Coarse Fluffy Floc |
| $Mg^{+2}$ | Magnesium Chloride | Very Slow (Days) | Higher | Fine Floc |
| $Mo^{+6}$ | Ammonium Molybdate | Slow | Same Higher | Fluffy Floc Fluffy Floc |
| $Ni^{+2}$ | Nickel Chloride | Fast | Higher | Fluffy Floc |
| $Sn^{+4}$ | Stannic Chloride | Fast | Higher | Hazy |
| $Sn^{+2}$ | Stannous Chloride | Fast | Higher | Fine Floc |
| $Sr^{+2}$ | Strontium Chloride | No Ppt | | |
| $Ti^{+4}$ | Titanium Chloride | Fast | Lower | Solid |
| $Zn^{+2}$ | Zinc Chloride | Fast | Lower | Fluffy Floc |
| $Zn^{+2}$ | Zinc Sulfate | Fast | Lower | Fluffy Floc |
| $Zr^{+4}$ | Zirconium Oxychloride | No Ppt | | |
| | Hydrochloric Acid | No Ppt | | |

EXAMPLE 9

An experiment in the effects of sodium hydroxide on iron sulfide formation was conducted on a reverse emulsion generated in the field by blending distilled water, a coastal California crude oil emulsified into the water and an iron salt solution in a Waring blender operated at full speed for 30 seconds. The resulting blend was separated into five test samples containing 6 ppm ferrous ions. Various amounts of a demulsifier blend containing 50% of the dithiocarbamate noted in Example 1, above, 20% Aerosol MA-80, 15% sodium hydroxide (50% solution) and 15% water (not including that added with the sodium hydroxide), were added to five of the samples. The following results were obtained:

| Sample | Blend* | Water Quality at # of Shakes | | |
|---|---|---|---|---|
| | | 25 | 50 | 75 |
| 1 | 0 | bad | bad | bad |
| 2 | 5 | fair | fair+ | fair+ |
| 3 | 15 | good– | good | good |
| 4 | 25 | good | good+ | good+ |
| 5 | 30 | good | good+ | good+ |

*Concentration in ppm of added blend.

Very little iron sulfide was detected in the treated samples. The floc developed in Samples 2–5 appeared mostly grey, with an observation of only a slight amount of iron sulfide. Good oil separation was noted in Samples 3–5.

EXAMPLE 10

An experiment similar to that of Example 6, above, was conducted on seven other reverse emulsion samples (100 cc each, capped and heated to 60° C.), with a demulsifier blend comprising 50% tridithiocarbamate (TDC) noted in Example 1, above, 17% ammonium or sodium salt of a fatty alcohol ethoxylate sulfate, represented in the ammonium salt form as $RO(CH_2CH_2O)_xSO_3NH_4$, wherein R is derived from a $C_8$ to $C_{10}$ fatty alcohol blend and x is about 3, 12% sodium hydroxide (50% solution), which caused the evolution of ammonia, and 21% water (in addition to that with the sodium hydroxide), added to six of the samples. Each sample contained 5 ppm ferrous ions added prior to the TDC. The following results were obtained:

| Sample | Blend* | Water Quality at # of Shakes | | | |
|---|---|---|---|---|---|
| | | 25 | 50 | 75 | 100 |
| 1 | 0 | bad | bad | bad | bad |
| 2 | 10 | fair | fair+ | fair | fair |
| 3 | 20 | fair+ | fair | fair+ | fair+ |
| 4 | 25 | good– | good– | good | good |
| 5 | 30 | good | good | good | good |
| 6 | 35 | good | good | good | good |
| 7 | 40 | fair– | fair– | fair– | fair– |

*Concentration in ppm of added blend.

The oil phase in Samples 4–7 appeared good after standing.

EXAMPLE 11

In a laboratory, a synthetic reverse emulsion was prepared by using a 27 API gravity crude oil (10% oil and 90% distilled water). The combination was blended in a Waring blender for one minute. The resulting emulsion was divided into three bottles, the first bottle being treated with 30 ppm of a mixture comprising 60% tridithiocarbamate and 10% Aerosol-18 (sulfo succinamate) and 30% water. The sample in the second bottle was treated with 100 ppm ferrous sulfate solution (10%) followed by 30 ppm of a blend of 60% tridithiocarbamate and 10% Aerosol AY65, 25% water and 5% sodium hydroxide (50% solution). Both bottles were agitated for 100 shakes. The sample in the second bottle exhibited very rapid demulsification, with the oil rising rapidly to the surface. The sample in the first bottle exhibited very little demulsification, and even on standing for 24 hours, the emulsion never produced a clear water phase. The sample in the second bottle exhibited a very clean water phase with improved even further on standing. The demulsification test was then repeated using tridithiocarbamate without sodium p-toluene sulfonate/$C_8$–$C_{10}$ alcohol modified with six moles of ethylene oxide sulfated with chlorosulfonic acid as its triethylamine salt (with and without excess base). A black plug of solids formed at the interface. This plug was not present in the prior trials using the fully formulated product.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A method for resolving an oil-and-water emulsion, the method comprising adding to the emulsion (1) if the emulsion does not contain polyvalent metal cations in at least a desirably high polyvalent metal cation concentration, said concentration being at least one part per million by weight, an amount of polyvalent metal cations sufficient to produce a treated emulsion having the desirably polyvalent metal cation concentration in the emulsion, and (2) an effective demulsifying amount of a combination of:

a. a composition comprising a polydithiocarbamate compound comprising at least two groups represented by the formula —$(OR^1)_xNHC(:S)SR^2$, wherein $R^1$ represents an alkylene group of 1 to 30 carbon atoms, $R^2$ represents an alkali metal, an alkaline earth metal, an ammonium group or an amine group, and x represents an integer of from 1 to about 250 independently selected for each of such groups such that the total of the integers x is, on average, from 3 to about 250; thereby to react together in the emulsion at least some of the polyvalent metal cations and the polydithiocarbamate compound to form a polymeric matrix; and b. a terminating agent for increasing the water solubility of the polymeric matrix, selected from the group consisting of:
  i. non-emulsifying hydrotropes containing a sulfonate group,
  ii. non-emulsifying hydrotropes containing a sulfate group,
  iii. coupling agents selected from the group consisting of sulfates of ethoxylated alcohols, sulfates of propoxylated/ethoxylated alcohols, sulfates of ethoxylated phenols, sulfates of propoxylated/ ethoxylated phenols, sulfates of ethoxylated amines and sulfates of propoxylated/ethoxylated amines, sulfonates of ethoxylated alcohols, sulfonates of propoxylated/ethoxylated alcohols, sulfonates of ethoxylated phenols, sulfonates of propoxylated/ ethoxylated phenols, sulfonates of ethoxylated amines and sulfonates of propoxylated/ethoxylated amines, and
  vi. mixtures thereof.

2. A method as set forth in claim 1, wherein the polydithiocarbamate compound is

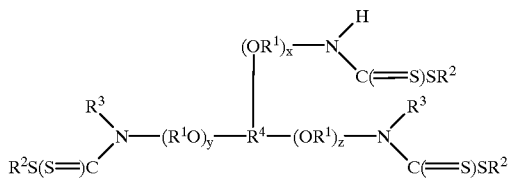

wherein each $R^3$ independently is a hydrogen, $C_1$ to $C_{30}$ alkenyl, aryl, aralkenyl or alkaryl or aralkyl group, $R^4$ represents an alkane triyl group of 1 to 30 carbon atoms and x, y and z represent integers which may be the same or different but each must equal at least 1, the sum of x+y+z, on average, being equal to 3 to 250.

3. A method as set forth in claim 2 wherein the emulsion does not have polyvalent metal cations in at least the desirably high polyvalent metal cation concentration and polyvalent metal cations are added to the emulsion to produce the treated emulsion.

4. A method as set forth in claim 3 wherein the polyvalent metal cations are added in the form of a water soluble metal salt and are added to the emulsion prior to the addition of the polydithiocarbamate compound.

5. A method as set forth in claim 4 wherein the emulsion contains divalent metal cations and the added polyvalent metal cations are trivalent.

6. A method as set forth in claim 5 wherein the metal salt is ferric sulfate.

7. A method as set forth in claim 3 wherein the added polyvalent metal cations are divalent or trivalent.

8. A method as set forth in claim 7 wherein the metal cations are iron cations.

9. A method as set forth in claim 3 wherein the desirably high concentration of polyvalent metal cations in the emulsion is at most about 25 part per million by weight.

10. A method as set forth in claim 9 wherein the desirably high concentration of polyvalent metal cations in the emulsion is at least about five parts per million by weight.

11. A method as set forth in claim 2 wherein the terminating agent is selected from the group consisting of a. sodium-p-toluene sulfonic acid, b. sodium-xylene sulfonic acid, c. sulfosuccinamides, d. sulfosuccinate esters, e. alkylbenzene sulfonates in which the alkyl group has up to about six carbons, f. oxyalkylated alcohol sulfates derived from a $C_6$ to $C_{10}$ alcohol oxyethylated with one to about seven moles ethylene oxide per mole alcohol, g. $R^3$—O—$(PrO)_n(EtO)_m$—$CH_2CH_2CH_2SO_3M$ wherein $R^3$ is a $C_1$ to $C_6$ alkyl, aryl or aralkyl group, M is a cation, Pr is propylene, Et is ethylene n is an integer from zero to about 59, m is an integer from one to about sixty and n+m is from one to about sixty, and h. mixtures thereof.

12. A method as set forth in claim 11 wherein M is sodium, n is from zero to about 29, m is from one to about thirty and n is from zero to about 29, m is from one to about thirty and n+m is from one to about thirty.

13. A method as set forth in claim 12 wherein n is from zero to about nineteen, m is from one to about twenty and n+m is from one to about twenty.

14. A method as set forth in claim 13 wherein n is from zero to about nine, m is from one to about ten and n+m is from one to about ten.

15. A method as set forth in claim 11 wherein the hydrotrope is selected from the group consisting of sodium-p-toluene sulfonic acid and sodium-xylene sulfonic acid.

16. A method as set forth in claim 2 wherein the terminating agent is selected from the group consisting of a. sodium toluene sulfonate, b. sodium xylene sulfonate, c. $ROSO_3M$, d. $RSO_3M$, e. $RO(CH_2CH_2O)_n(CH_2)_3SO_3M$, f. 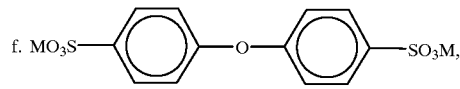

g. 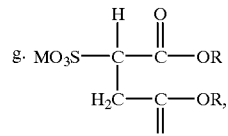

h. 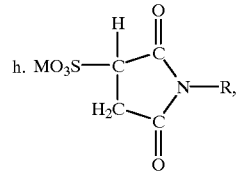

-continued i. $MO_3S-\underset{\underset{H_2C-\underset{\underset{O}{\parallel}}{C}-OM,}{|}}{\overset{H}{C}}-\overset{O}{\overset{\parallel}{C}}-OR$ j. $MO_3S-\underset{\underset{H_2C-\underset{\underset{O}{\parallel}}{C}-OM}{|}}{\overset{H}{C}}-\overset{O}{\overset{\parallel}{C}}-O(CH_2CH_2O)-R,$ k. $\underset{\underset{\overset{|}{R''}}{R-N-(CH_2CH_2O)_y-H}}{(CH_2CH_2O)_x-CH_2\overset{\overset{OH}{|}}{C}HCH_2SO_3M}$ l. $R'N-(CH_2CH_2O)_x-CH_2CH_2CH_2SO_3M$, and m. mixtures thereof, wherein each of R, R' and R'' is, independently, a 6 to 18 carbon organic radical, x and y are non-negative integers, provided that where x and y are both present, x+y=2 to about 50, M is a cation and n is an integer from one to about ten.

17. A method as set forth in claim 16 wherein M is sodium or potassium.

18. A method as set forth in claim 2 wherein $R^4$ represents

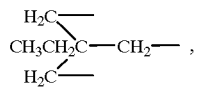

$R^1$ represents isopropylene, $R^2$ represents sodium or potassium and x+y+z, on average, equals 3 to about 10.

19. A method as set forth in claim 11 wherein $R^4$ represents

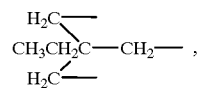

$R^1$ represents isopropylene, $R^2$ represents sodium or potassium and x+y+z, on average, equals 3 to about 10.

20. A method as set forth in claim 2 wherein the desirably high concentration of polyvalent metal cations in the emulsion is at most about 25 parts per million by weight.

21. A method as set forth in claim 20 wherein the desirably high concentration of polyvalent metal cations in the emulsion is at least about five parts per million by weight.

22. A method as set forth in claim 2 wherein the emulsion is an oil-in-water emulsion.

23. A method as set forth in claim 2 wherein the emulsion is a water-in-oil emulsion.

24. A method as set forth in claim 2 wherein the hydrotrope is added to the emulsion before the compound is added.

25. A method as set forth in claim 2 wherein the polydithiocarbamate compound is added to the emulsion before the hydrotrope is added.

26. A method as set forth in claim 2 wherein the hydrotrope and the polydithiocarbamate compound are added simultaneously to the emulsion.

27. A method as set forth in claim 2 wherein $R^3$ is hydrogen, alkyl or alkenyl.

28. A method as set forth in claim 27 wherein $R^3$ is hydrogen.

29. A method as set forth in claim 1 wherein the composition further comprises a monodithiocarbamate compound containing a single group represented by the formula $-(OR^1)_xNHC(:S)SR^2$, wherein $R^1$, $R^2$ and x are as defined in claim 1.

30. A method as set forth in claim 1 wherein the polyvalent metal cations and polydithiocarbamate compound also react with the terminating agent.

31. A method as set forth in claim 30 wherein the polydithiocarbamate compound reacts with the polyvalent metal cations by first reacting with the terminating agent to produce an intermediate and then the intermediate reacts with the polyvalent metal cations.

* * * * *